US00RE49707E

(19) United States
(12) Reissued Patent
Fourney

(10) Patent Number: US RE49,707 E
(45) Date of Reissued Patent: Oct. 24, 2023

(54) SYSTEMS AND METHODS FOR DIVERTING OBJECTS

(71) Applicant: LAITRAM, L.L.C., Harahan, LA (US)

(72) Inventor: Matthew L. Fourney, Laurel, MD (US)

(73) Assignee: LAITRAM, L.L.C., Harahan, LA (US)

(21) Appl. No.: 17/695,457

(22) Filed: Mar. 15, 2022

Related U.S. Patent Documents

Reissue of:
(64) Patent No.: 7,461,739
Issued: Dec. 9, 2008
Appl. No.: 11/627,132
Filed: Jan. 25, 2007

U.S. Applications:
(60) Provisional application No. 60/762,227, filed on Jan. 26, 2006.

(51) Int. Cl.
*B65G 17/24* (2006.01)

(52) U.S. Cl.
CPC ..... *B65G 17/24* (2013.01)

(58) Field of Classification Search
CPC ..... B65G 17/24; B65G 47/34; B65G 13/071
See application file for complete search history.

(56) References Cited

U.S. PATENT DOCUMENTS

| | | | | |
|---|---|---|---|---|
| 3,104,004 | A * | 9/1963 | Poel et al. | 198/367 |
| 3,550,756 | A * | 12/1970 | Kornylak | 198/637 |
| 4,096,936 | A * | 6/1978 | Nielsen | B65G 39/00 198/370.06 |
| 5,551,543 | A * | 9/1996 | Mattingly et al. | 198/370.09 |
| 6,044,956 | A * | 4/2000 | Henson et al. | 198/370.02 |
| 6,073,747 | A * | 6/2000 | Takino et al. | 198/370.09 |
| 6,318,544 | B1 | 11/2001 | O'Connor | |
| 6,494,312 | B2 * | 12/2002 | Costanzo | 198/779 |
| 6,758,323 | B2 * | 7/2004 | Costanzo | 198/457.02 |
| 6,923,309 | B2 * | 8/2005 | Costanzo | 198/411 |
| 6,968,941 | B2 * | 11/2005 | Fourney | 198/779 |
| 7,040,478 | B2 * | 5/2006 | Ehlert | 198/370.09 |
| 7,137,505 | B2 | 11/2006 | Stebnicki et al. | |
| 7,147,097 | B2 * | 12/2006 | Lemm | 198/370.01 |
| 7,191,894 | B2 * | 3/2007 | Costanzo et al. | 198/457.05 |

(Continued)

FOREIGN PATENT DOCUMENTS

| | | |
|---|---|---|
| JP | 1991088617 | 4/1991 |
| JP | 1995279469 | 10/1995 |
| WO | WO 2004078621 | * 9/2004 |

OTHER PUBLICATIONS

Attachment: English computer translation of CNIPA Invalidity Decision of Chinese Patent No. 200780003527.8, Jun. 18, 2021.

*Primary Examiner* — William C Doerrler
(74) *Attorney, Agent, or Firm* — Thomas Horstemeyer, LLP

(57) ABSTRACT

In one embodiment, a conveyor system includes a conveyor belt having a plurality of conveyor belt rollers configured to divert objects on the conveyor belt, and a drive mechanism that engages the conveyor belt rollers, the drive mechanism being configured to drive the conveyor belt rollers, the drive mechanism being adjustable such that the conveyor belt rollers can be selectively driven in a first angular direction and a second, opposite angular direction so that objects can be selectively diverted to either side of the conveyor belt at a desired diverting angle.

44 Claims, 12 Drawing Sheets

(56) References Cited

U.S. PATENT DOCUMENTS

| | | | | |
|---|---|---|---|---|
| 7,237,670 | B1 * | 7/2007 | Ryan et al. | 198/779 |
| 7,249,669 | B2 * | 7/2007 | Fourney | 198/370.09 |
| 7,284,653 | B2 * | 10/2007 | Fourney et al. | 198/370.03 |
| 7,306,086 | B2 * | 12/2007 | Boelaars | 193/35 SS |
| 7,311,192 | B2 * | 12/2007 | Fourney | 198/779 |
| 7,344,018 | B2 * | 3/2008 | Costanzo et al. | 198/779 |
| 7,360,641 | B1 * | 4/2008 | Fourney | 198/779 |

* cited by examiner

SYSTEMS AND METHODS FOR DIVERTING OBJECTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS-REFERENCE TO RELATED APPLICATION]

*CROSS REFERENCE TO RELATED APPLICATIONS*

This application *is a reissue application of U.S. Ser. No. 11/627,132, filed Jan. 25, 2007, which issued as U.S. Pat. No. 7,461,739 on Dec. 9, 2008, which* claims priority to [copending] U.S. provisional application entitled "Systems and Methods for a Variable Angle High-Speed Diverting Conveyor System," having Ser. No. 60/762,227, filed Jan. 26, 2006, *both of* which [is] *are* entirely incorporated herein by reference.

BACKGROUND

It is often necessary to divert objects from a conveyor belt, for example to another conveyor belt, for purposes of routing or positioning the objects for processing of one type or another.

Recently, conveyor systems have been developed in which the conveyor belt comprises a plurality of small, angled rollers that extend beyond the top and bottom surfaces of the belt. With such systems, objects carried by the conveyor belt, and more particularly by the rollers contained within the belt, can be diverted from the belt by rotating the rollers. The conveyor belt rollers can be caused to rotate using various methods. In one such method, the rollers are driven by selectively bringing a friction plate located beneath the conveyor belt into and out of engagement with the rollers. When the plate engages the rollers, the rollers are caused to rotate in response to the frictional forces between the friction plate and the rollers. In another method, free-spinning rollers located below the conveyor belt are selectively engaged with and disengaged from the conveyor belt rollers, and friction between the engaged rollers causes rotation of both sets of rollers in opposite directions.

Although the above-described conveyor systems provide significant advantages in relation to diverting objects from a conveyor belt, some limitations in their use still exist. For example, because the angles of the conveyor belt rollers are fixed, diverting can only be performed to one side of the conveyor belt and at a fixed diverting angle. Therefore, if it is desired to change the diverting direction or angle, the conveyor line must be shut down and the conveyor belt must be replaced with a different conveyor belt having rollers arranged in a different orientation.

A further disadvantage relates to roller slip. Specifically, when a friction plate is brought into contact with the rollers, the rollers must accelerate from zero angular velocity to a final angular velocity proportional to the speed at which the conveyor belt is travelling. Given that the rollers cannot instantaneously accelerate to the final angular velocity, roller slip occurs that causes wear to the rollers. The same phenomenon can occur, albeit to a lesser degree, in embodiments that employ free-spinning rollers to rotate the conveyor belt rollers. Specifically, although rotation of the free-spinning rollers reduces slip, slip can still occur during the period just after roller-to-roller contact is made.

Furthermore, when the friction plate or the free-spinning rollers are disengaged from the conveyor belt rollers, the conveyor belt rollers are free to rotate, which can enable objects present on the conveyor belt to drift across the belt. Although such drift may be desirable in some situations, it may be undesirable in situations in which it is desired to precisely control the lateral position of an object on the conveyor belt.

BRIEF DESCRIPTION OF THE DRAWINGS

The disclosed systems and methods can be understood with reference to the following drawings. The components in the drawings are not necessarily to scale.

DETAILED DESCRIPTION

As described above, existing conveyor systems that include conveyor belt rollers, although providing advantages over previous systems, still have limitations. As described in the following, however, such limitations can be overcome with a conveyor system that employs a drive mechanism comprising free-spinning angularly adjustable rollers that control rotation of rollers contained within a conveyor belt. In some embodiments, a conveyor belt comprises a plurality of longitudinally oriented free-spinning rollers that are "driven" through contact with free-spinning angularly adjustable rollers that are positioned below the conveyor belt. In such systems, objects can be diverted at various angles to either side of the conveyor belt through mere actuation of the angularly adjustable rollers. Furthermore, when the angularly adjustable rollers are aligned with the direction of belt travel, the conveyor belt rollers can be braked such that they will not rotate, thereby reducing or eliminating object drift. Moreover, given that the angularly adjustable rollers can be gradually rotated from the braking orientation to a desired diverting angle, the conveyor belt rollers can be gradually accelerated, thereby reducing or eliminating slip.

Figure 1:
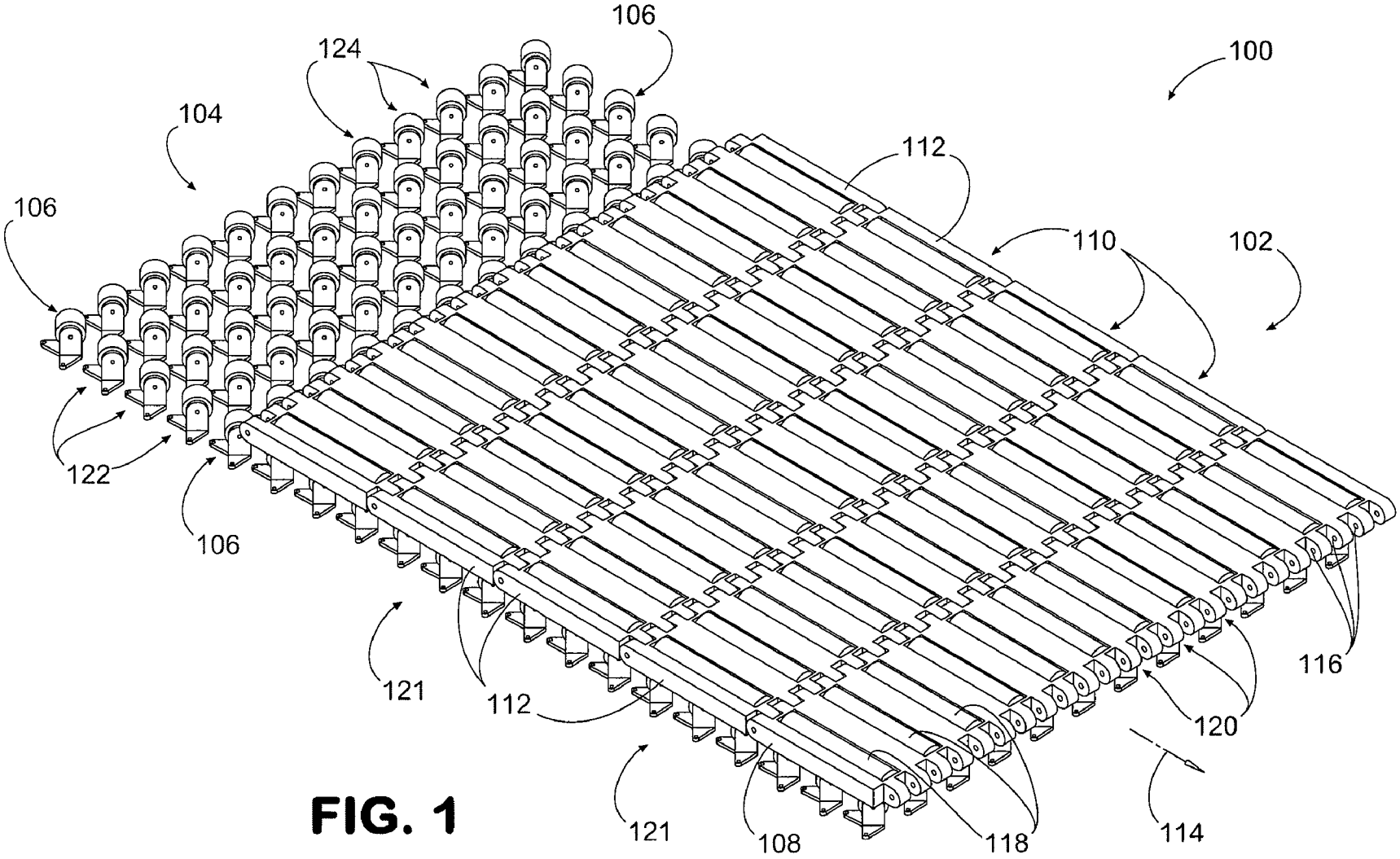
FIG. 1 is a top perspective view of a first embodiment of a portion of a conveyor system.

Referring to the figures, in which like numerals indicate corresponding parts throughout the several views, FIG. 1 illustrates an embodiment of a portion of a conveyor system 100 that can be adjusted to divert objects at various angles to either side of the system. As indicated in FIG. 1, the conveyor system 100 comprises a conveyor belt 102 and a field 104 of angularly adjustable "drive" roller modules 106. In the embodiment of FIG. 1, the conveyor belt 102 comprises a conveyor belt frame 108 that is composed of a plurality of transverse modular conveyor belt sections 110. Within each conveyor belt section 110 is a plurality of elongated conveyor belt links 112 that extend in the direction of belt travel 114 and connect to adjacent conveyor belt links of adjacent conveyor belt sections. By way of example, each conveyor belt link 112 comprises a metal or plastic member having an opening 116 provided at each of its opposed ends that receives a rod or shaft (not shown) that passes through the openings of conveyor belt links of adjacent conveyor belt sections 110 so as to connect the conveyor belt sections to each other.

Interposed between the conveyor belt links 112 are elongated longitudinally oriented free-spinning conveyor belt rollers 118. For the purposes of this disclosure, the term "free-spinning" means that the rollers are free to spin about their axes of rotation in either angular direction. Therefore, the rollers 118 may be said to comprise "idler" rollers that will freely rotate in either angular direction when driven by an appropriate force. In the embodiment of FIG. 1, the rollers 118 are positioned such that their axes of rotation are parallel to the direction of belt travel 114. As shown in FIG. 1, the rollers 118 can be alternately provided along the width of each conveyor belt section 110 in relation to the conveyor belt links 112 such that a roller is positioned between each pair of adjacent conveyor belt links. In such an arrangement, the rollers 118 of the various conveyor belt sections 110 can be arranged in columns 120 that extend in the direction of belt travel 114 and rows 121 that extend across the width of the conveyor belt 102. It is noted that, although the rollers 118 have been described and depicted as being elongated, the rollers need not necessarily be elongated in the direction of their axes of rotation.

Figure 7:
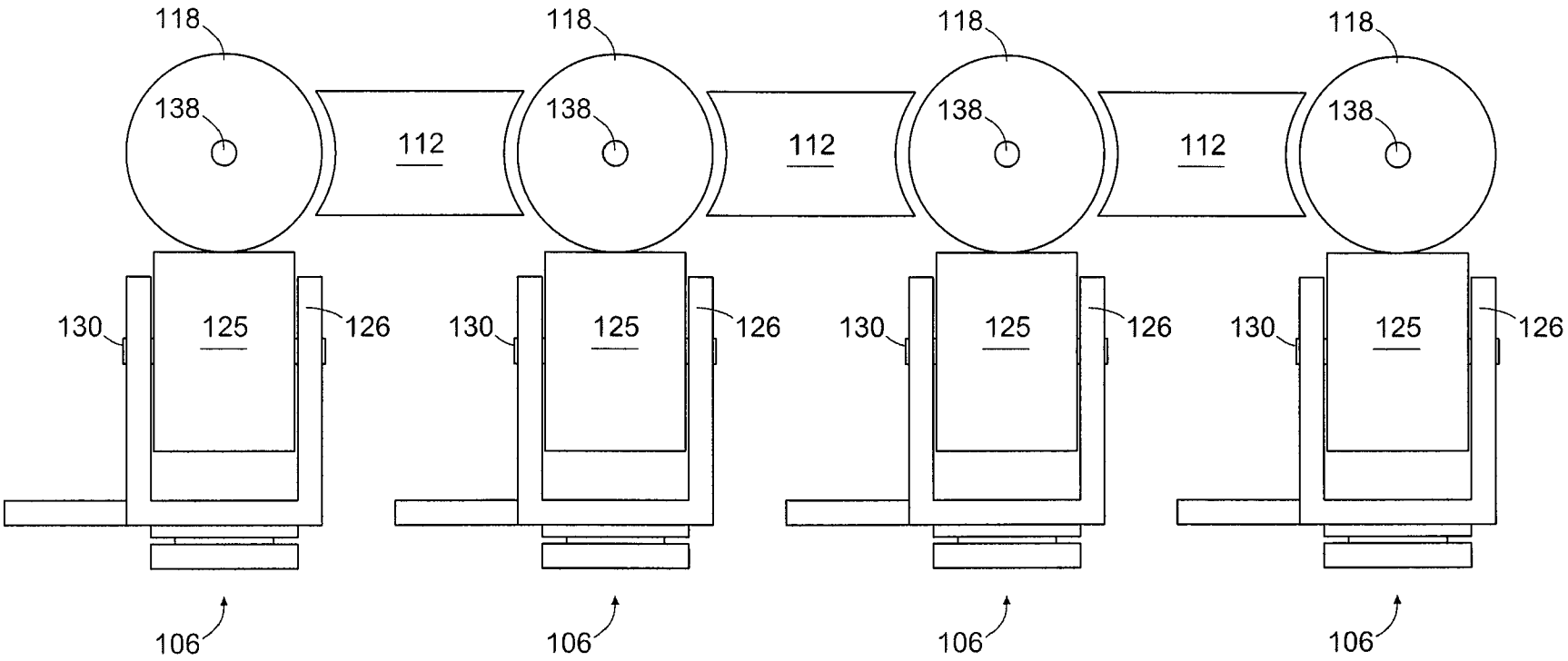
FIG. 7 is an end view of a portion of the conveyor system of FIG. 1, illustrating a braking function provided by angularly adjustable drive rollers of the system.

The conveyor belt rollers 118 are made of metal and/or plastic and are provided with a rubber or plastic high-friction outer layer or coating that prevents slippage when rollers of the roller modules 106 are brought into contact with the conveyor belt rollers. Each roller 118 can connect at each of its ends to the conveyor belt frame 108 and/or to the rods or shafts that connect the various conveyor belt sections 110. As indicated in FIG. 7, the rollers 118 are dimensioned so as to extend beyond the upper and lower surfaces of the conveyor belt frame 108 (and belt links 112) such that they can both divert objects placed on the conveyor belt 102 and can be driven from below by the drive roller modules 106.

With further reference to FIG. 1, the field 104 of angularly adjustable drive roller modules 106 comprises a plurality rows 122 and columns 124 of drive roller modules. The drive roller modules 106 are positioned such that their columns 124 align with the columns 120 of the conveyor belt rollers 118 and their rows 122, at least intermittently during conveyor system operation, align with rows 121 of conveyor belt rollers. In the first embodiment shown in FIG. 1, the drive roller modules 106 comprise relatively short (in the dimension of their axes of rotation) caster rollers (see FIGS. 2A and 2B) that are positioned closely enough to each other such that at least one drive roller is aligned with any given conveyor belt roller 118 during the operation. Indeed, in the embodiment of FIG. 1, the drive roller modules 106 are positioned closely enough such that at least two drive rollers are positioned adjacent any given conveyor belt roller 118, during conveyor operation.

Figure 2A:
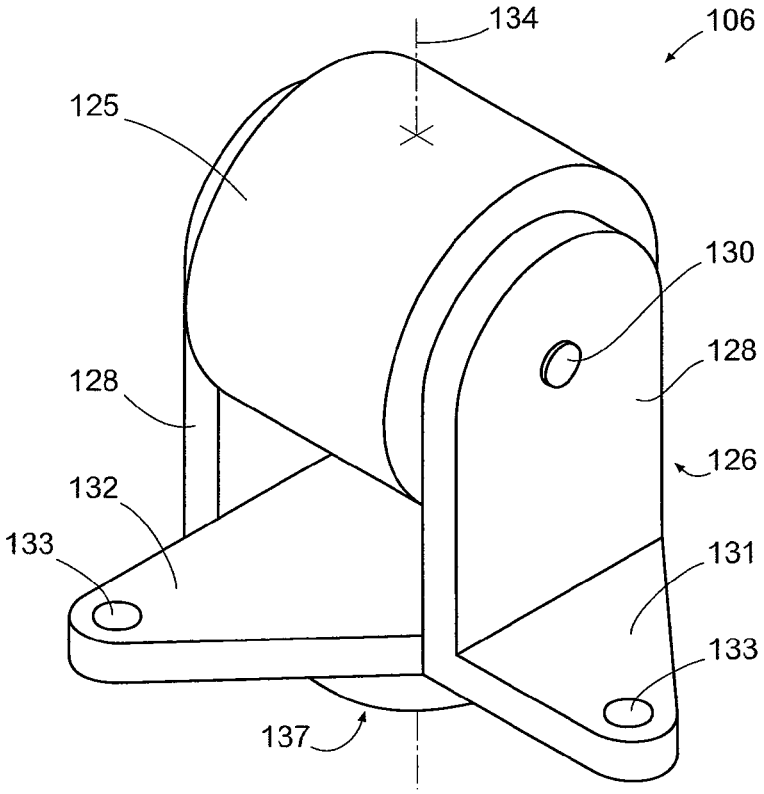
FIG. 2A is a top perspective view of a drive roller module used in the conveyor system of FIG. 1.
Figure 2B:
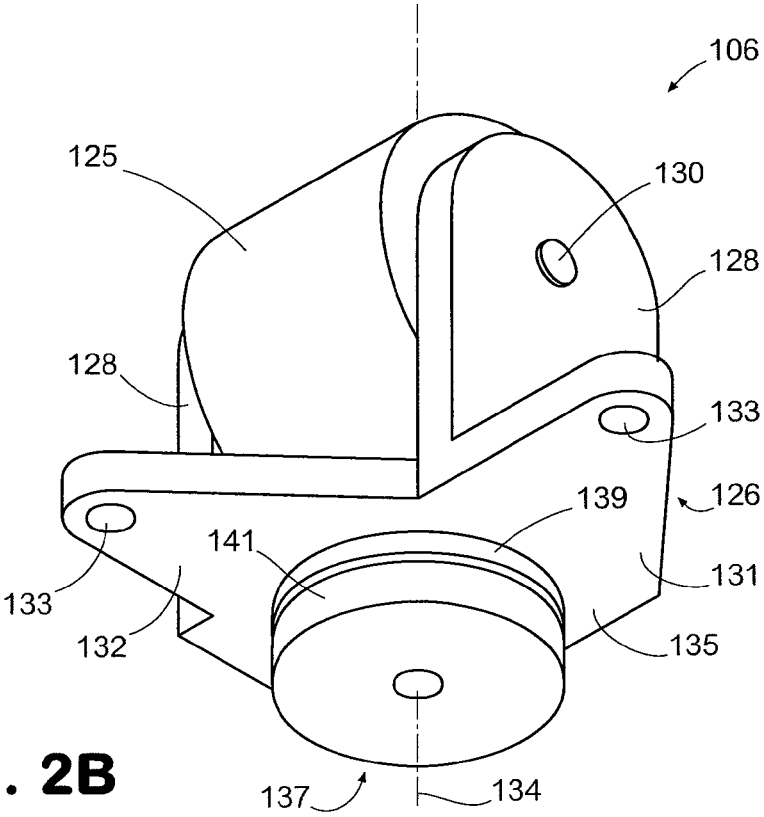
FIG. 2B is a bottom perspective view of a drive roller module used in the conveyor system of FIG. 1.

Turning to FIGS. 2A and 2B, which illustrate perspective views of a single drive roller module 106, each drive roller module includes a free-spinning drive roller 125 that is free to rotate in either angular direction relative to its axis of rotation. Accordingly, although designated as "drive" rollers, the drive rollers 125 are not themselves driven by some mechanical means, such as a motor or the like. By way of example, each drive roller 125 is made of metal and/or plastic and, like the conveyor belt rollers 118, has a rubber or plastic high-friction outer layer or coating.

As shown in FIGS. 2A and 2B, the drive roller 125 is supported within a frame 126 that comprises opposed vertical support members 128. Extending between the support members 128 and through a central opening provided in the drive roller 125 (not shown) is a shaft 130 about which the drive roller can rotate (i.e., the axis of rotation). In addition to the support members 128, the frame 126 comprises first and second control arms 131 and 132 that, as described below, can be used to pivot the drive roller module 106 about a central vertical axis 134 to adjust the angle of the roller 125 relative to the direction of belt travel 114 (FIG. 1). As indicated in FIGS. 2A and 2B, each control arm 131, 132 comprises an opening 133 that enables pivotal connection to an appropriate member that is used to adjust the angular orientation of the drive roller module 106.

As best shown in FIG. 2B, the frame 126 further includes a base 135 and a pivot mechanism 137 that supports the base. In the embodiment of FIG. 2B, the pivot mechanism 137 comprises upper and lower portions 139 and 141 that can rotate in opposite directions relative to each other and thereby enable pivoting of the drive roller module 106. Suitable friction reducing elements, such as bearings, can be provided between the portions 139 and 141 to facilitate such pivoting.

Figure 3:
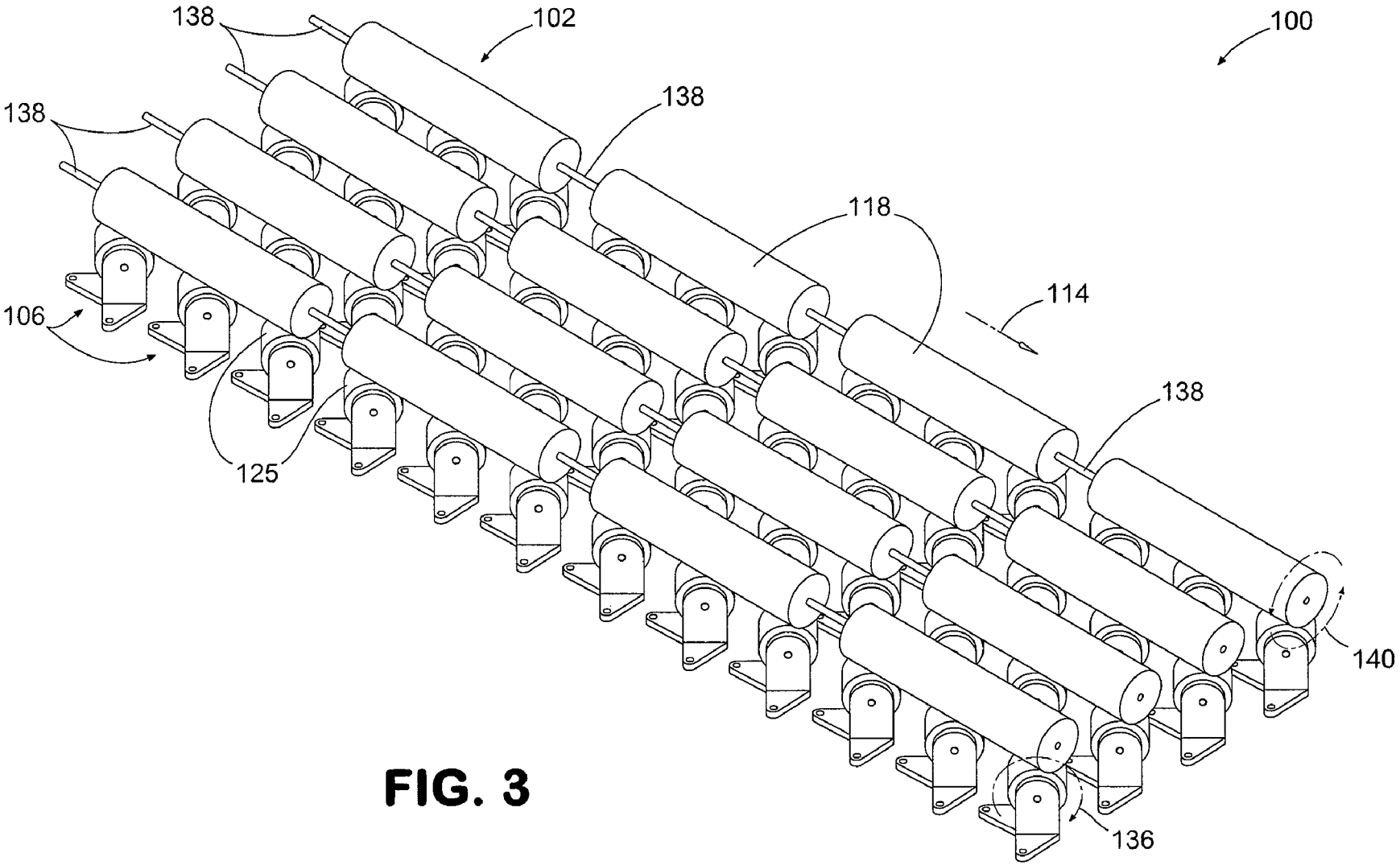
FIG. 3 is top perspective view of a further portion of the conveyor system of FIG. 1.

FIG. 3 illustrates a further portion of the conveyor system 100. More particularly, FIG. 3 illustrates interaction between the drive rollers 125 and the conveyor belt rollers 118. Notably, the conveyor belt frame 108 is not shown in the figure for purposes of clarity in describing other components of the conveyor system 100.

As indicated in FIG. 3, the drive rollers 125 are positioned so as to contact the conveyor belt rollers 118 such that movement of the conveyor belt 120 in the direction of belt travel 114 causes rotation of both the drive rollers and the conveyor belt rollers due to the frictional forces between them. In the orientation shown in FIG. 3, the drive rollers 125 rotate in a downstream direction indicated by arrow 136. As a consequence of that rotation, the conveyor belt rollers 118 are caused to rotate, or are "driven," about their shafts 138 (i.e., axes of rotation) in the direction indicated by arrow 140. Accordingly, in FIG. 3, the conveyor belt rollers 118 rotate counterclockwise (when viewing the conveyor belt 102 from its end looking upstream) and would therefore divert objects supported by the conveyor belt rollers to the left in the orientation of the figure. As is further shown in FIG. 3, each conveyor belt roller 118 is driven in the above manner by multiple drive rollers 125.

Figure 4:
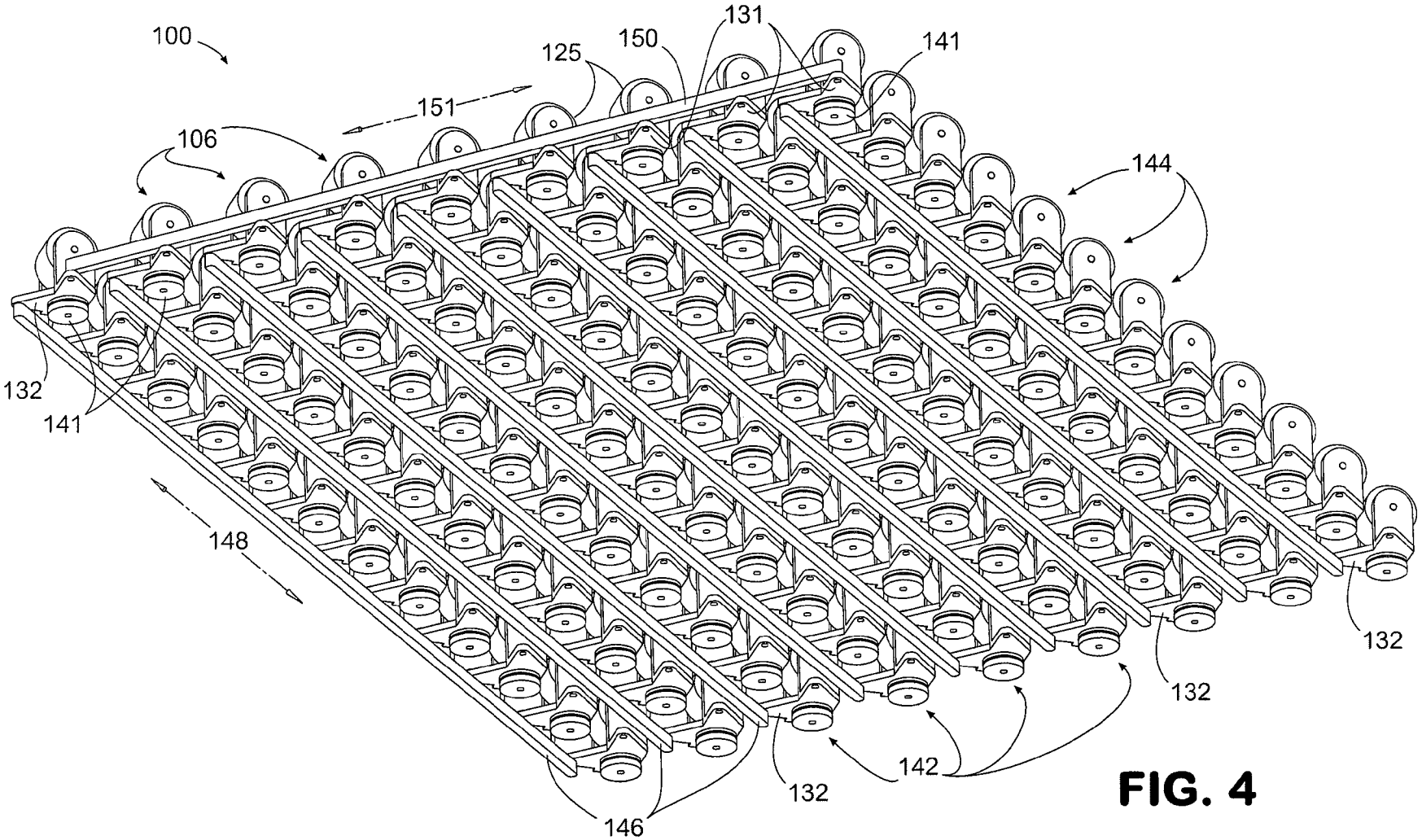
FIG. 4 is a bottom perspective view of a plurality of drive roller modules used in the conveyor system of FIG. 1.

As described above, the drive roller modules 106, and therefore the drive rollers 125, can be pivoted about their central vertical axes 134 (FIGS. 2A and 2B) to adjust their angulation relative to the direction of belt travel. The drive rollers 125 can be independently actuated or actuated in synchrony in groups. FIG. 4 illustrate a mechanism for enabling the latter actuation scheme (conveyor belt 102 not shown). As indicated in FIG. 4, a plurality of rows 142 and columns 144 of drive roller modules 106 are provided having the general configuration described in relation to FIG. 2. As is further indicated in FIG. 4, the rows 142 of drive roller modules 106 are linked together with linking members 146 that control the angular orientation of the rollers 125. More particularly, control arms 132 of the drive roller modules 106 are pivotally connected to a linking member 146, which can take the form of a rod or shaft. By way of example, that connection is made with pins (not shown) that extend through the openings 133 (FIGS. 2A and 2B) provided in the control arms 132 of the drive roller modules 106 and into aligned openings (not shown) of the linking member 146. When the position of each drive roller module 106 is fixed relative to its central vertical axis 134, for example due to fixation of the lower portion 141 of the pivot mechanism 137 (FIGS. 2A and 2B), transverse displacement of the linking members 146 in the directions indicated by arrow 148 causes the rollers 125 to pivot about the central vertical axes, thereby adjusting their angular orientation.

The linking members 146 can be displaced by any appropriate means. In embodiments in which multiple linking members 146 are to be simultaneously displaced, and therefore multiple rows of rollers 125 are to be simultaneously pivoted, the linking members can be connected to a single actuation member 150 that is positioned adjacent either side of the conveyor system 100 and pivotally connected to control arms 131 of an adjacent column 144 of drive roller modules 106. In such a case, longitudinal displacement of the actuation member 150 in the directions indicated by arrow 151 will cause pivoting of the adjacent column 144 of drive roller modules 106, which therefore causes the linking members 146 to laterally translate, which, in turn, causes the remaining drive roller modules to pivot.

Figure 5A:
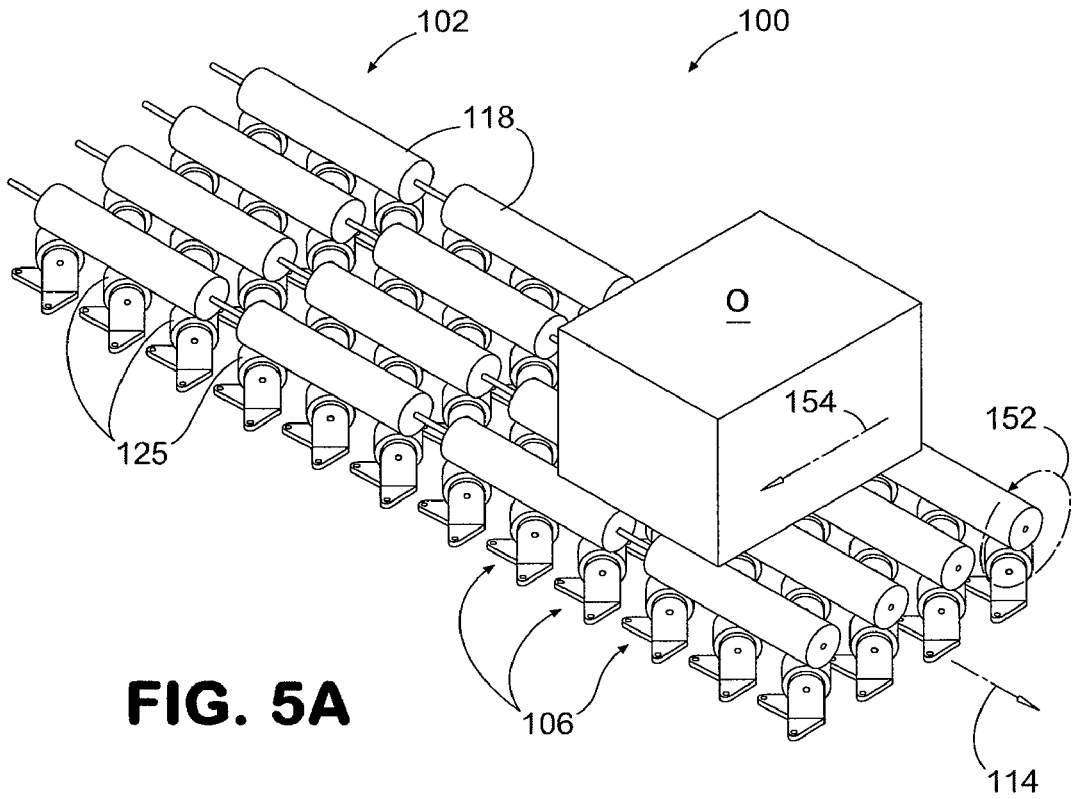
FIG. 5A is a view of the conveyor system portion shown in FIG. 3, illustrating diverting action in a first direction.
Figure 5B:
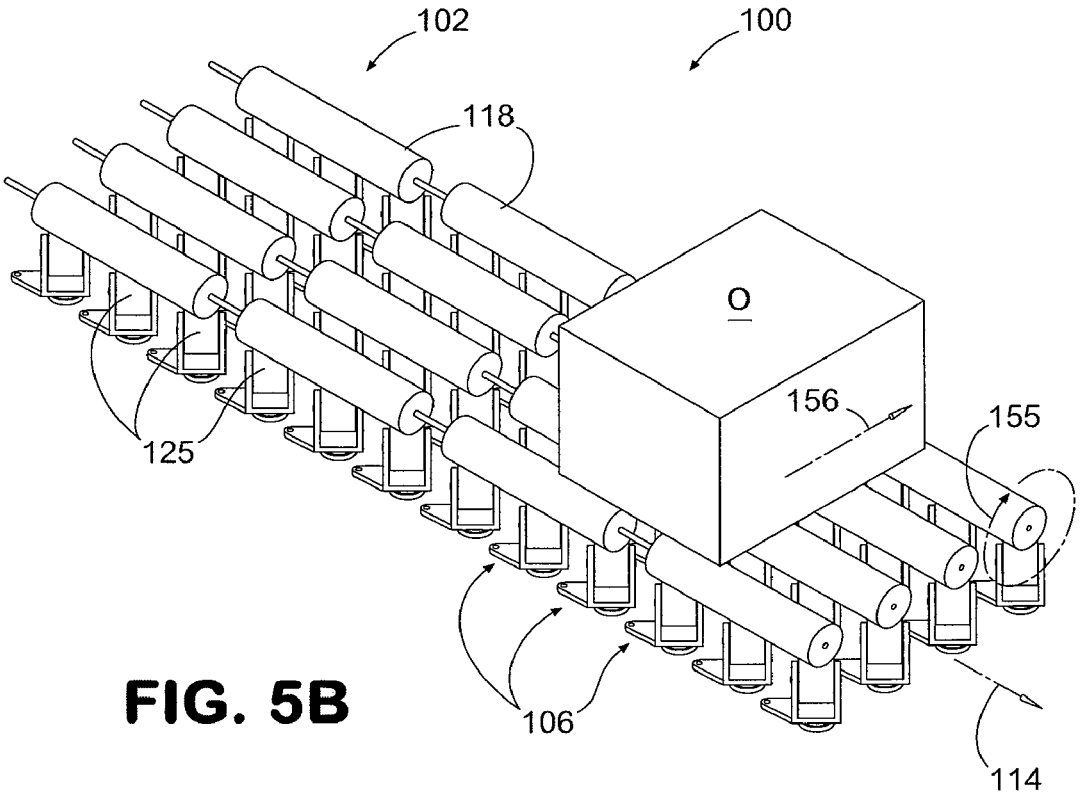
FIG. 5B is a view of the conveyor system portion shown in FIG. 3, illustrating diverting action in a second direction.

FIGS. 5A and 5B illustrate the effect of angular adjustment of the drive roller modules 106. Notably, the conveyor belt frame 108 is not shown in FIGS. 5A and 5B for purposes of clarity in describing other components of the conveyor system 100. Beginning with FIG. 5A, the drive roller modules 106 have been pivoted in a counterclockwise direction (when the conveyor belt 102 is viewed from above) to cause counterclockwise rotation (when the conveyor belt is viewed from its end looking upstream) of the conveyor belt rollers 118, as indicated by arrow 152. Such rotation of the conveyor belt rollers 118 causes diverting action in a leftward direction in the orientation of FIG. 5A, so as to displace an object, O, in the direction of arrow 154. In FIG. 5B, however, the drive roller modules 106 have been pivoted in a clockwise direction (when the conveyor belt 102 is viewed from above) to cause the conveyor belt rollers 118 to rotate in a clockwise direction (when the conveyor belt 102 is viewed from its end looking upstream) indicated by arrow 155 to cause diverting action in a rightward direction and displace the object, O, in the direction of arrow 156.

Figure 6A:
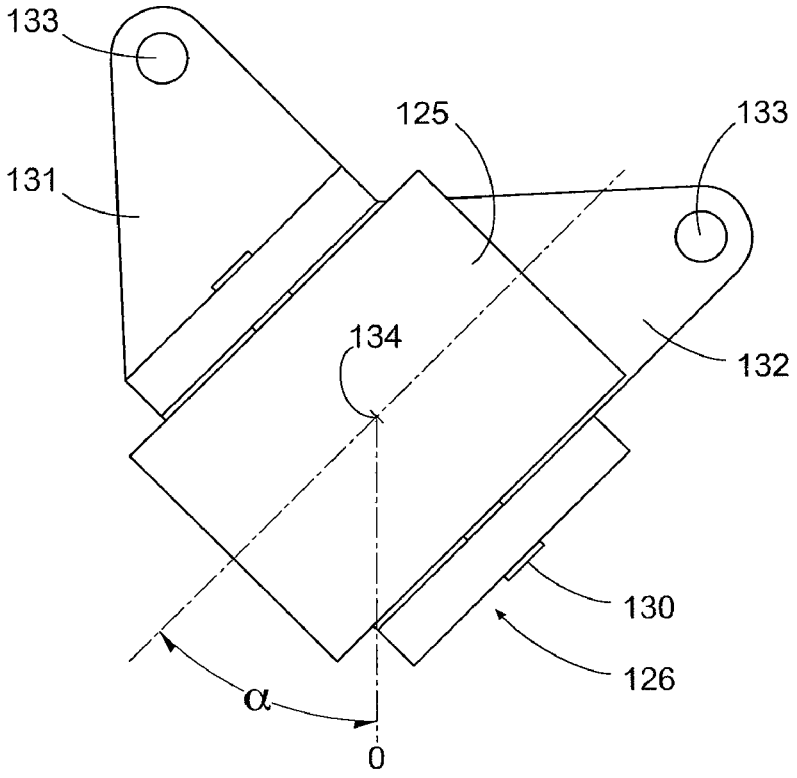
FIG. 6A is a top view of a drive roller module, illustrating pivoting of the module in a first angular direction.
Figure 6B:
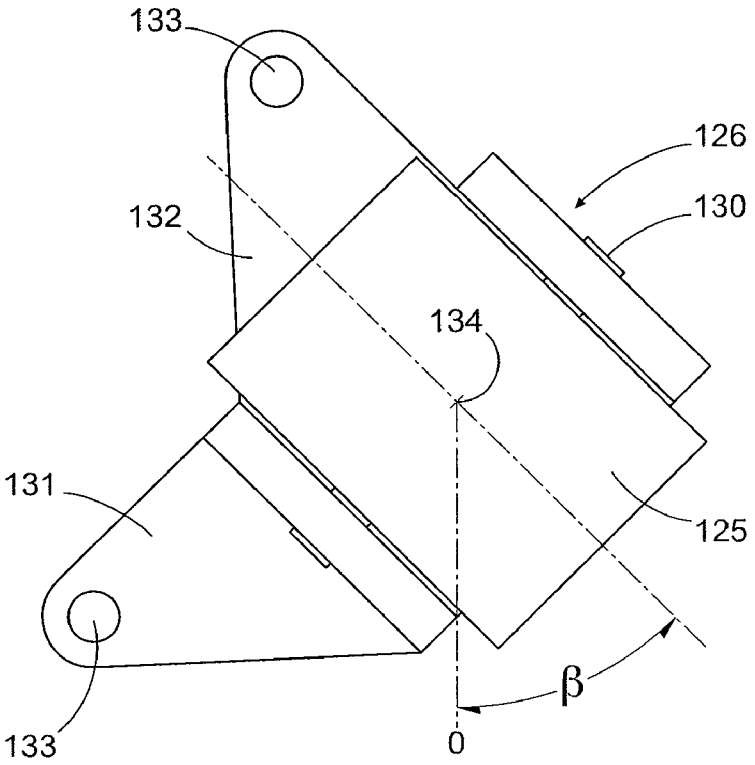
FIG. 6B is a top view of a drive roller module, illustrating pivoting of the module in a second angular direction.

FIGS. 6A and 6B illustrate the variability of diverting angles possible with the drive roller modules 106. As indicated in FIG. 6A, each drive roller module 106 can potentially be taken from a 0 degree orientation, in which the axis of rotation of the roller 125 is perpendicular to the direction of conveyor belt travel, to some negative angle represented by $\alpha$. As indicted in FIG. 6B, the drive roller module 106 can also be taken from the 0 degree orientation to some positive angle represented by $\beta$. In some embodiments, both $\alpha$ and $\beta$ can comprise any angle from 0 to 90 degrees, thereby equating to 180 degrees of angular variability. Although such a broad range of angular variability is possible, conveyor belt speed and limitations of the materials used for the drive rollers 125 and conveyor belt rollers 118 may limit the range of angular orientations in which roller slip can be avoided. However, angular ranges of at least approximately −70 degrees to 70 degrees are achievable at conveyor belt speeds of at least 100 feet/minute using known high-friction surfaces. Notably, the angular displacement of the drive rollers 125 directly corresponds to the resultant diverting angle. For example, when the drive rollers 125 are oriented 35 degrees clockwise of the 0 degree orientation as shown in FIG. 6A, a 35 degree diverting angle to the right direction results.

When the drive rollers 125 are positioned in the 0 degree orientation shown in FIG. 7, in which the axes of rotation of the drive rollers are perpendicular to the direction belt travel and the direction of angular rotation of the drive rollers is in line with the direction of belt travel, the conveyor belt rollers 118 are substantially prevented from rotating and are therefore "braked." Accordingly, undesired lateral movement of objects on the conveyor belt can be prevented, if desired, by controlling the drive roller modules 106, to be placed in the 0 degree orientation. It is further noted that when the angular orientation of the drive rollers 125 is adjusted from the 0 degree orientation as an initial position, the conveyor belt rollers 118 can be gradually accelerated in one direction or the other, thereby decreasing or all together preventing the roller slip that can occur when a friction plate or angled rollers suddenly engage the conveyor belt rollers. Gradual acceleration of the conveyor belt rollers 125 also enables relatively unstable objects to be diverted without tipping over. For instance, if an object to be diverted is relatively tall and has a relatively small base, the object can be gradually accelerated to one side or the other of the conveyor belt 102 by slowly increasing the angulation of the drive rollers from the 0 degree orientation.

Figure 8A:
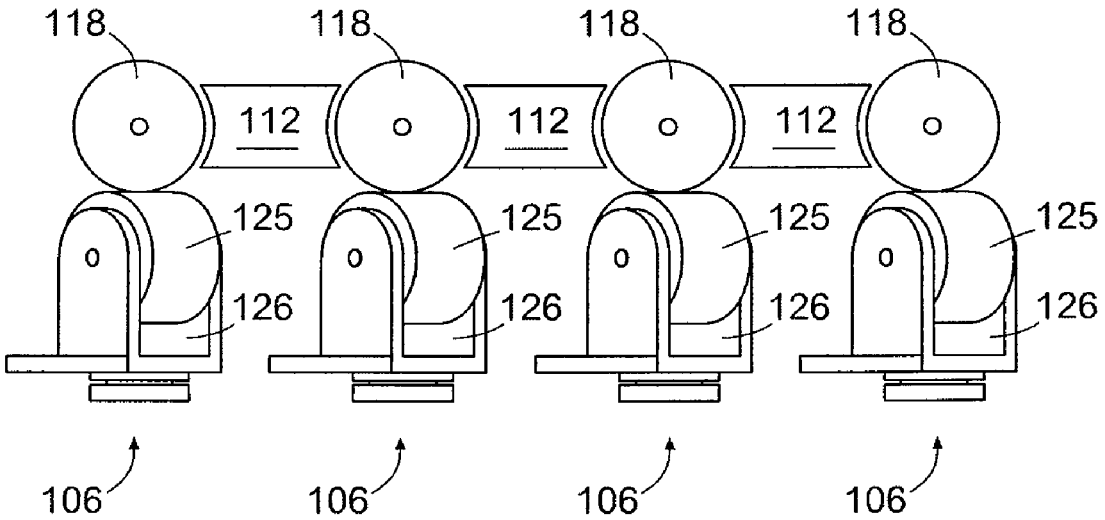
FIG. 8A is an end of a portion of the conveyor system of FIG. 1, illustrating engagement of angularly adjustable drive rollers and conveyor belt drive rollers.
Figure 8B:
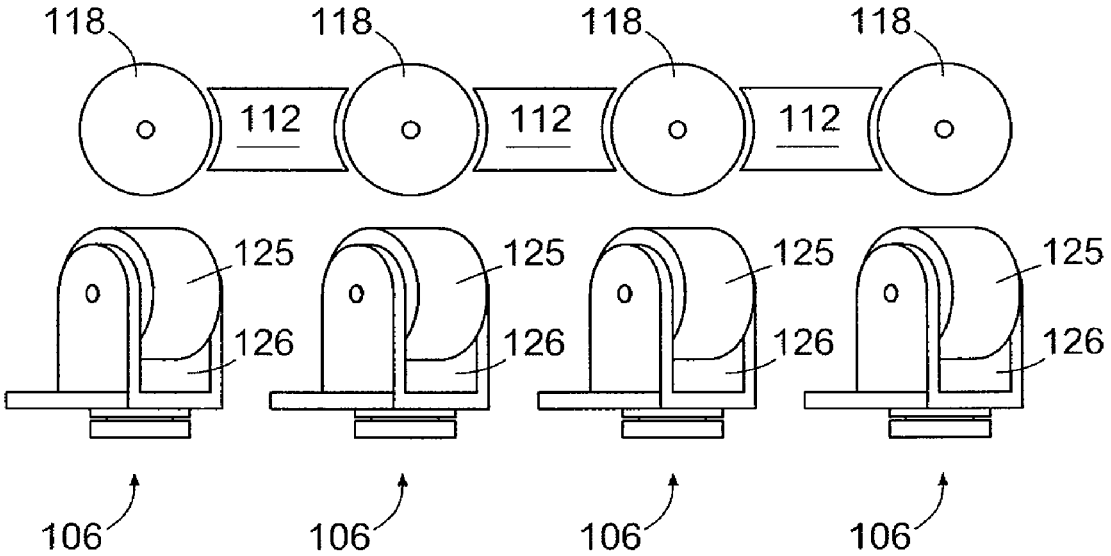
FIG. 8B is an end of a portion of the conveyor system of FIG. 1, illustrating disengagement of angularly adjustable drive rollers and conveyor belt drive rollers.

In addition to being angularly adjustable, the drive roller modules 106 can, optionally, be vertically actuated to engage or disengage the drive rollers 125 with conveyor belt rollers 118. Such functionality is depicted in FIGS. 8A and 8B. In particular, FIG. 8A illustrates the drive rollers 125 in engagement with the conveyor belt rollers 118, while FIG. 8B illustrates the drive rollers disengaged from the conveyor belt rollers. Such selective engagement and disengagement can be provided with an appropriate mechanism (not shown) that lifts the drive rollers 125 into contact with the conveyor belt rollers 118 and lowers the drive rollers out of contact with the conveyor belt rollers.

From the above it can be appreciated that several advantages can be achieved through use of conveyor systems that comprise angularly adjustable rollers that drive rollers contained within a conveyor belt. For example, objects can be diverted to either side of the conveyor system at various angles. In addition, the conveyor belt rollers can be braked to control object drift across the conveyor belt. Furthermore, the conveyor belt rollers can be accelerated to some desired angular velocity with virtually no slip.

It is noted that other advantages can also be realized with such conveyor systems. For example, discrete groups of drive rollers can be operated in different zones of the conveyor system not only along the direction of travel of the conveyor belt but also along the width of the conveyor belt through the provision of discrete control mechanisms (e.g., linking members). In such cases, the positions of objects on the conveyor belt can be controlled with great precision by individually controlling the drive rollers of the different zones. In fact, when a "smart" detection and control system is provided, such as an imaging-based system, individual objects can be identified and precisely moved along and/or across the belt, for example to enable desired ordering and/or alignment of the objects on further conveyor belts on which the objects are to be placed.

Figure 9:
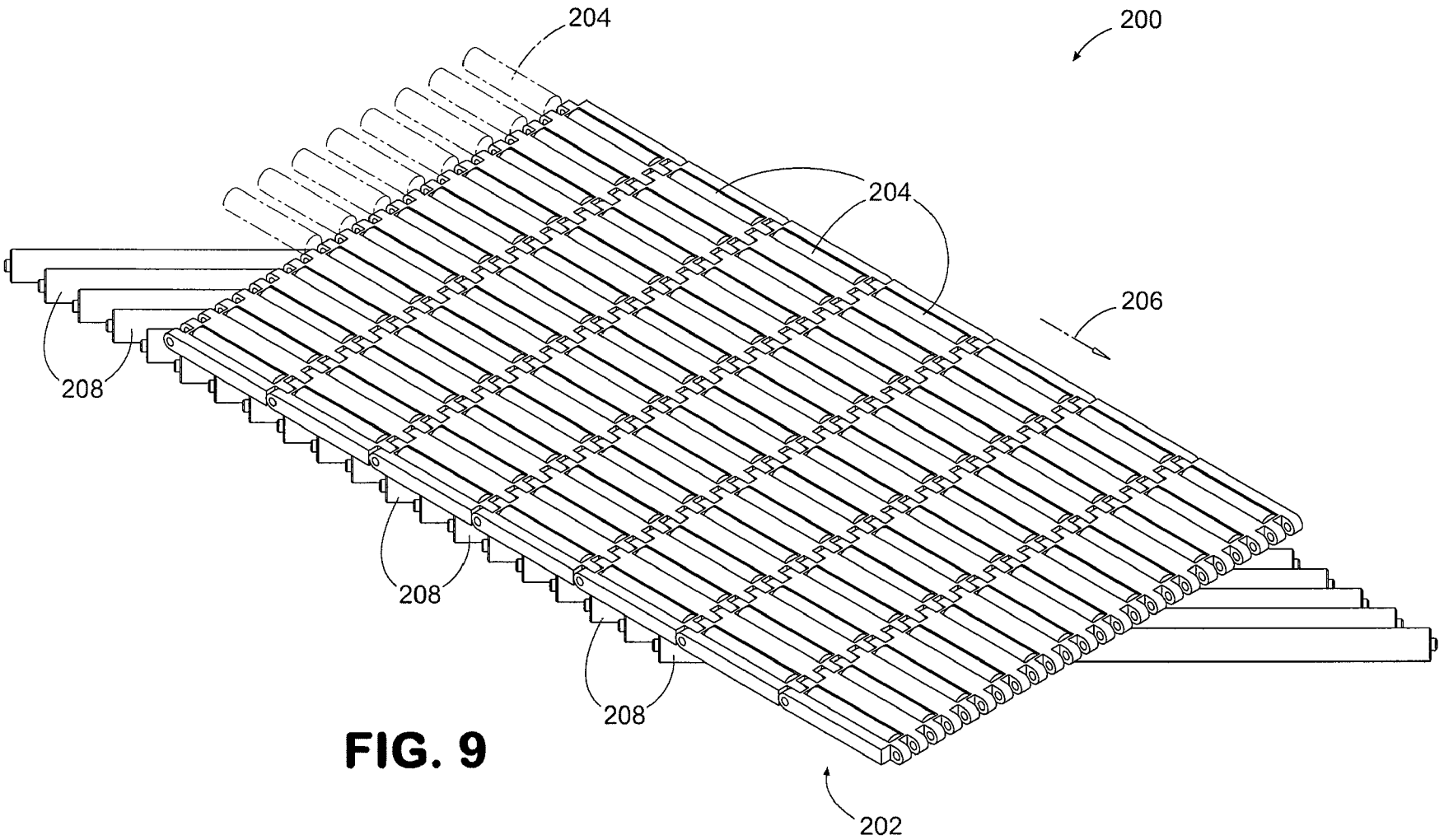
FIG. 9 is a top perspective view of a second embodiment of a portion of a conveyor system.

Turning to FIG. 9, illustrated is a second embodiment of a portion of a conveyor system 200. As indicated in that figure, the conveyor system 200 is similar in several ways to the conveyor system 100 shown in FIG. 1. Therefore, the conveyor system 200 generally comprises a conveyor belt 202 that includes a plurality of longitudinally oriented free-spinning conveyor belt rollers 204. The conveyor belt 202 travels in a direction of belt travel identified by arrow 206. In addition, the system 200 comprises a plurality of free-spinning angularly adjustable drive rollers 208. In the system 200, however, the drive rollers 208 are elongated, or "longitudinal," rollers instead of caster rollers. In the embodiment shown in FIG. 9, the drive rollers 206 are longer than the conveyor belt 202 is wide.

Figures 10A, 10B, 10C:
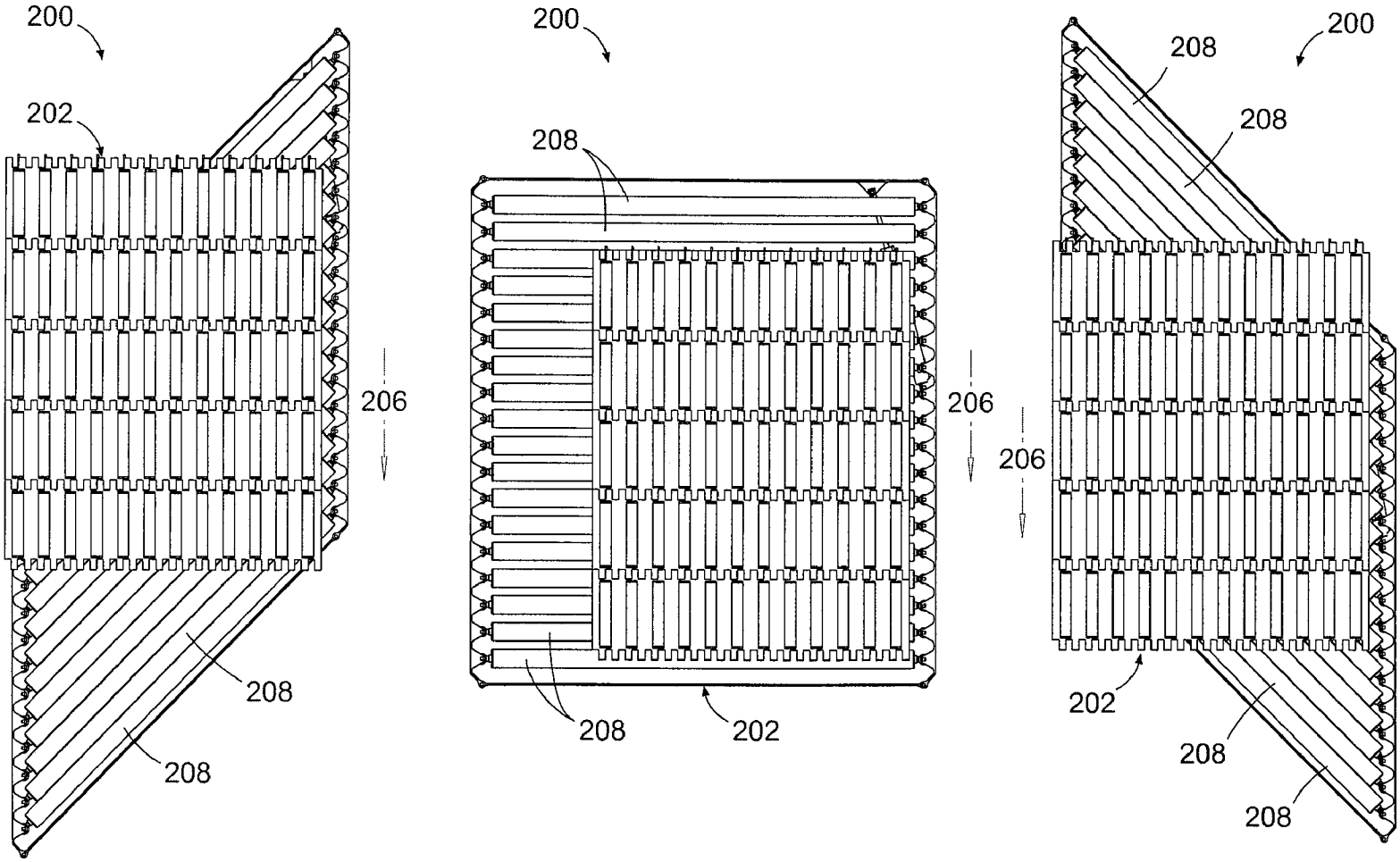
FIGS. 10A-10C are top views of the conveyor system of FIG. 9, illustrating angular adjustment of drive rollers of the system to adjust diverting angle.

FIGS. 10A-10C illustrate angular adjustment of the drive rollers 208 relative to the conveyor belt 202. In particular, assuming a conveyor belt direction of travel indicated by arrow 206, FIG. 10A illustrates an angulation of the drive rollers 208 that results in the diverting of objects to the left, FIG. 10B illustrates the "braking" orientation of the drive rollers, and FIG. 10C illustrates an angulation of the driver rollers that results in the diverting of objects to the right.

Figure 11B:
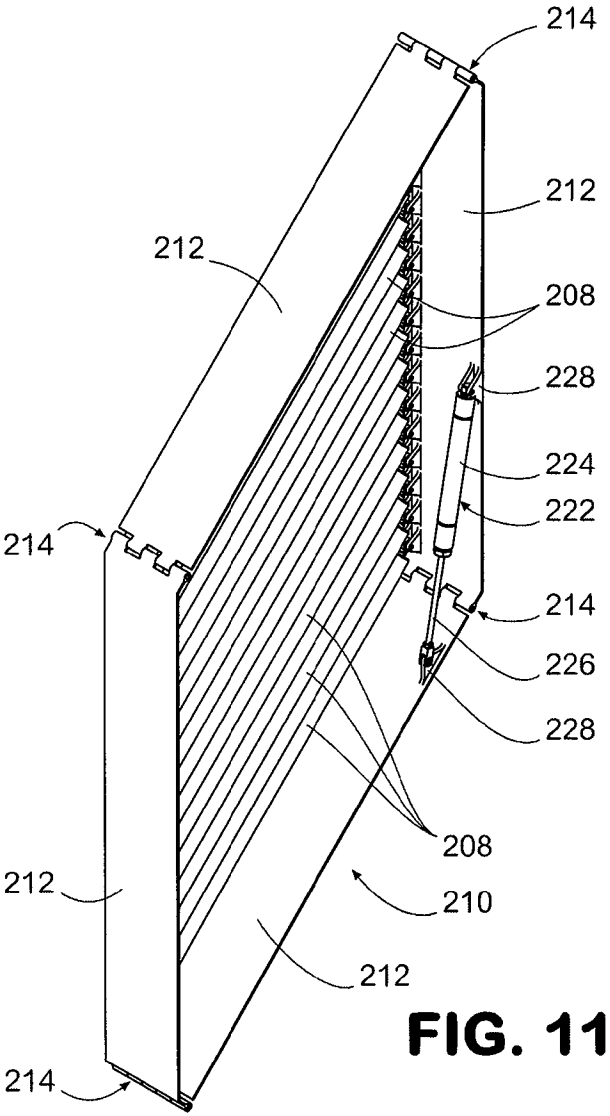
FIGS. 11A and 11B are perspective views of an embodiment of a mechanism that can be used to adjust the angulation of the drive rollers of the conveyor system of FIG. 9.
Figure 11A:
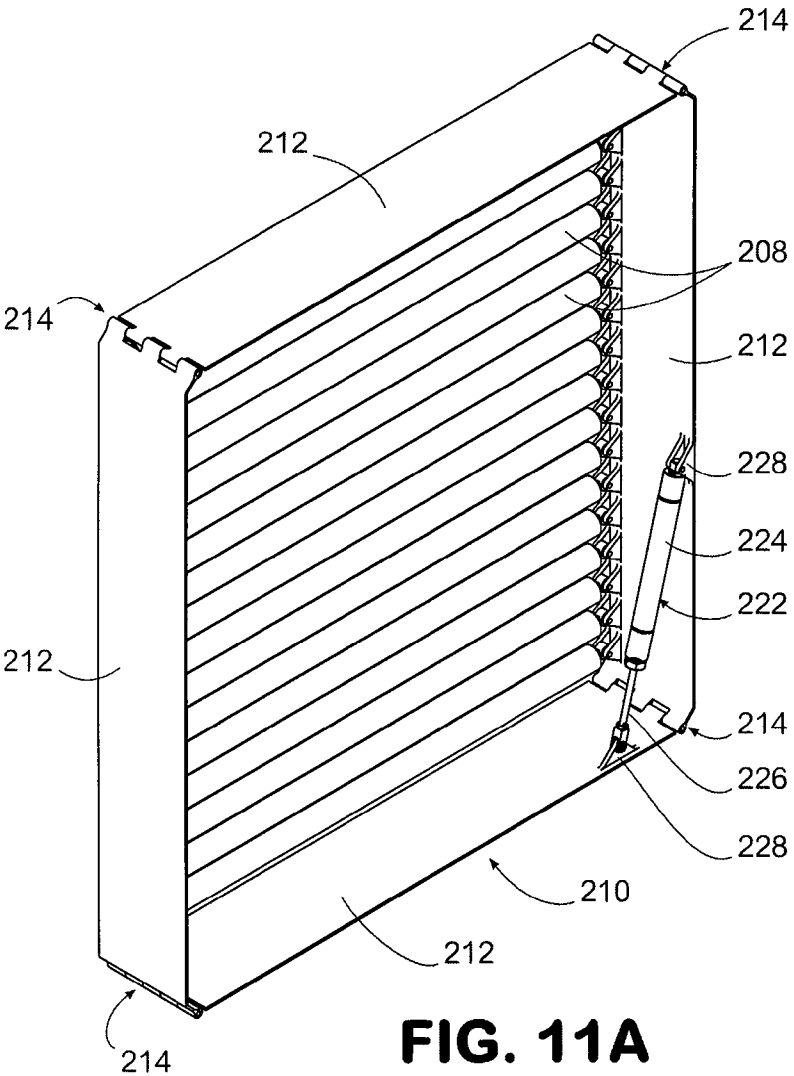

As with the conveyor system 100, the drive rollers 208 can be angularly adjusted using a variety of adjustment mechanisms. FIGS. 11A and 11B illustrate one such mechanism (conveyor belt not shown for purposes of clarity). As shown in those figures, the drive rollers 208 can be pivotally supported by a rectangular frame 210 comprising multiple frame members 212 that are pivotally connected to each other at pivot joints 214 located at corners of the frame. By way of example, each pivot joint 214 is formed by leaves of the frame members 212 that interleave with each other and are secured together with a pin or shaft (not shown). With such a configuration, orientation of the frame 210 can be changed from the orthogonal orientation shown in FIG. 11A, in which the frame members 212 form approximately 90 degree angles at each of the corners of the frame, to another orientation at which two acute angles and two obtuse angles are formed at the frame corners, as shown in FIG. 11B, thereby placing the frame into a parallelogram shape. In the orthogonal orientation of FIG. 11A, the drive rollers 208 are aligned so as to be perpendicular to the direction of belt, as indicated in FIG. 10B. Therefore, the orthogonal orientation of FIG. 11A is the braking orientation. At other orientations, however, such as that indicated in FIG. 11B, the drive rollers 208 are oriented such that they are positioned at an angle relative to the direction of belt travel, thereby providing the diverting function.

Figure 12:
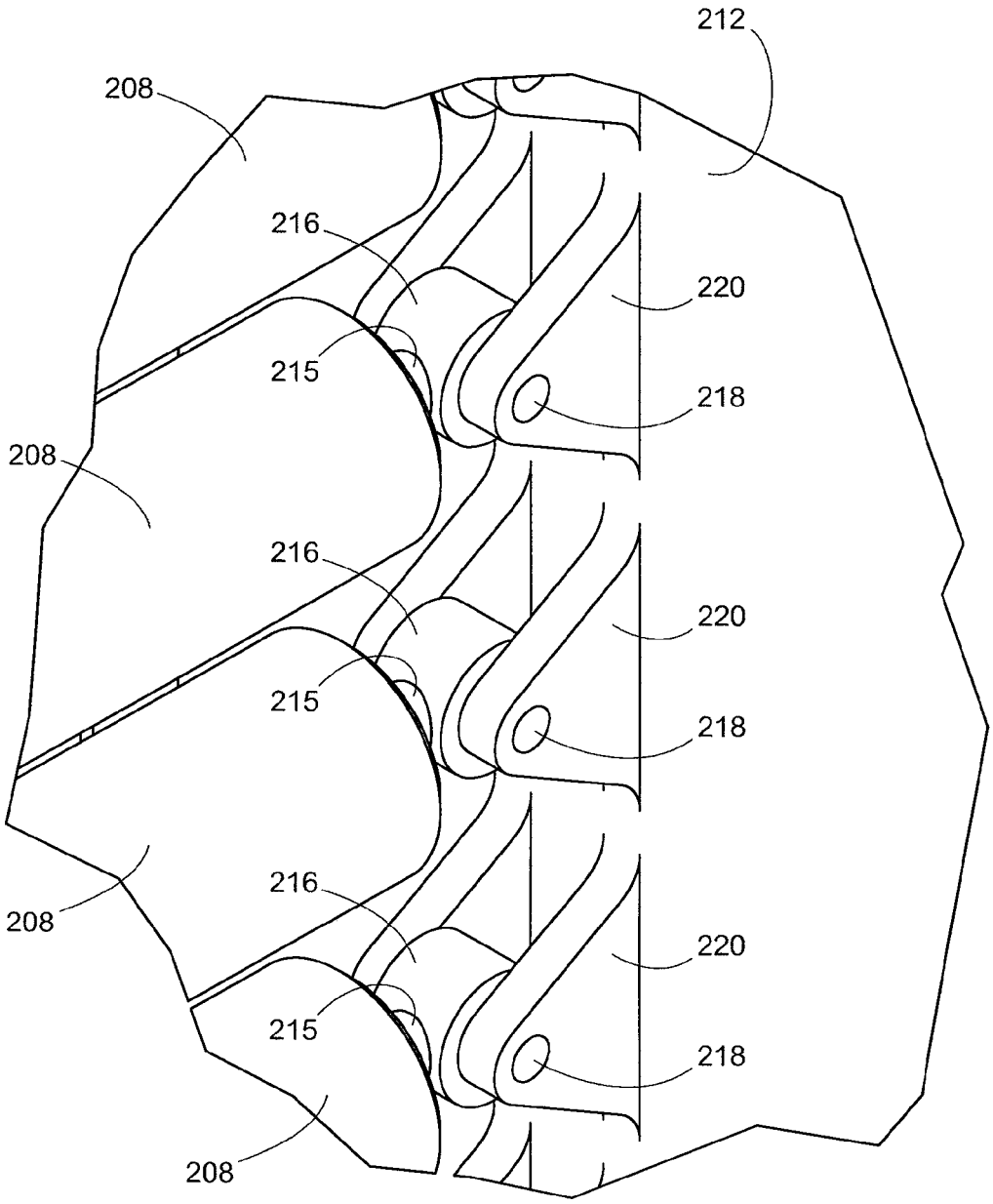
FIG. 12 is a detail view of an embodiment of joints that support ends of drive rollers in the conveyor system of FIG. 9.

Each drive roller 208 is supported at both ends by a joint that permits the change in orientation as well as free rotation. With reference to the detail view of FIG. 12, each drive roller 208 can, for example, be supported by a shaft 215 having "eye" connectors 216 configured to receive a pin 218 that extends through a support bracket 220 that is mounted to a frame member 212.

Returning to FIGS. 11A and 11B, the frame 210 can be manipulated in the manner described above by, for example, using an actuator 222. In the embodiment shown in FIGS. 11A and 11B, the actuator 222 comprises a piston member having a piston body 224 from which a piston arm 226 can be extended, for instance under the influence of hydraulic or pneumatic pressure. Both the piston body 224 and the piston arm 226 are pivotally connected to adjacent frame members 212 with mounting brackets 228. With such an arrangement, retraction of the piston arm 226 into the piston body 224 results in angular adjustment of the drive rollers 208 in a first angular direction, while extension of the piston arm from the piston body results in angular adjustment of the drive rollers in a second, opposite angular direction. Such manipulation is evident from FIGS. 11A and 11B. In particular, FIG. 11A illustrates a first extent of extension of the piston arm 226 from the piston body 224 and a first orientation of the drive rollers 208, while FIG. 11B illustrates a second (greater) extent of extension of the piston arm from the piston body and a second orientation of the drive rollers. Through appropriate extension and retraction of the piston arm 226, the orientation of the drive rollers 208 can be precisely controlled and diverting of objects can be achieved to either side of the conveyor belt 202 at various diverting angles as depicted in FIGS. 10A-10C.

While particular embodiments have been disclosed in detail in the foregoing description and drawings for purposes of example, it will be understood by those skilled in the art that variations and modifications thereof can be made without departing from the scope of the disclosure. In one such variation, the axles of the conveyor belt rollers can serve as the tensioning members of the conveyor belt. In such a case, the conveyor belt frame and its links can be omitted to enable higher roller density. In addition, such an arrangement may reduce the possibility of items being pulled down into the conveyor belt when the belt rollers are spinning because the surfaces of adjacent rollers move in opposite directions and the downward force of one spinning roller may be nullified by the upward force of the adjacent spinning roller.

What is claimed is:

1. A conveyor system comprising:

a conveyor belt having *an upper surface, a lower surface, and* a plurality of *free-spinning* conveyor belt rollers *protruding above the upper surface and* configured to divert objects on the conveyor belt; and a drive mechanism that engages the conveyor belt rollers, the drive mechanism being configured to drive the conveyor belt rollers, the drive mechanism being adjustable such that at least one individual conveyor belt roller can be selectively rotated in a first angular direction and a second angular direction so that objects can be selectively diverted to either side of the conveyor belt at a desired diverting angle.

2. The system of claim 1, wherein the conveyor belt rollers have axes of rotation that are aligned with a direction of travel of the conveyor belt such that the conveyor belt rollers can divert objects in either transverse direction across the conveyor belt.

3. The system of claim 1, wherein the conveyor belt rollers are elongated in a direction of their axes of rotation.

4. The system of claim 1, wherein the drive mechanism comprises a plurality of free-spinning angularly adjustable drive rollers that engage the conveyor belt rollers, such engagement causing the conveyor belt rollers to rotate when a direction of rotation of the drive rollers is not aligned with a direction of belt travel.

5. The system of claim 4, wherein the angularly adjustable drive rollers can be adjusted from an orientation in which they rotate in a direction in line with the direction of belt travel to orientations in which they rotate in directions that form an angle with the direction of belt travel.

6. The system of claim 5, wherein the greater the angle between the direction of drive roller rotation and the direction of belt travel the greater a diverting angle at which objects are diverted by the conveyor belt.

7. The system of claim 5, wherein the diverting angle can extend from approximately −90 degrees to approximately 90 degrees relative to the direction of belt travel.

8. The system of claim 5, wherein the diverting angle can extend from at least approximately −70 degrees to at least approximately 70 degrees relative to the direction of belt travel.

9. A conveyor system comprising:

a conveyor belt having a plurality of free-spinning conveyor belt rollers configured to *directly contact and* divert objects across the conveyor belt, the conveyor belt rollers having axes of rotation that are aligned with a direction of travel of the belt such that the conveyor belt rollers can divert objects in either transverse direction across the conveyor belt; and a plurality of free-spinning angularly adjustable drive rollers that engage the conveyor belt rollers, such engagement causing the conveyor belt rollers to rotate when a direction of rotation of the drive rollers is not aligned with the direction of belt travel, wherein the angular orientation of the drive rollers can be adjusted relative to the direction of belt travel to change a diverting direction and a diverting angle of the conveyor belt.

10. The system of claim 9, wherein the conveyor belt rollers are elongated in a direction of their axes of rotation.

11. The system of claim 9, wherein the angularly adjustable drive rollers can be adjusted from an orientation in which they rotate in a direction in line with the direction of belt travel to orientations in which they rotate in directions that form an angle with the direction of belt travel, the angle being equivalent in magnitude to the diverting angle.

12. The system of claim 11, wherein the diverting angle can extend from approximately −90 degrees to approximately 90 degrees relative to the direction of belt travel.

13. The system of claim 11, wherein the diverting angle can extend from at least approximately −70 degrees to at least approximately 70 degrees relative to the direction of belt travel.

14. The system of claim 9, wherein the angularly adjustable drive rollers can be selectively engaged with and disengaged from the conveyor belt rollers.

15. The system of claim 9, wherein the angularly adjustable drive rollers comprise relatively short caster rollers.

16. The system of claim 15, wherein at least two angularly adjustable drive rollers are positioned adjacent a conveyor belt roller during conveyor operation.

17. The system of claim 15, wherein the angularly adjustable drive rollers are aligned in rows transverse to the direction of belt travel and columns aligned with the direction of belt travel.

18. The system of claim 15, wherein at least some of the angularly adjustable drive rollers are independently actuable such that an angular orientation of at least some of the drive rollers can be independently controlled.

19. The system of claim 15, wherein at least some of the angularly adjustable drive rollers are actuable together in groups such that an angular orientation of at least some of the drive rollers can be controlled in synchrony.

20. The system of claim 9, wherein the angularly adjustable drive rollers are elongated in a direction of their axes of rotation.

21. The system of claim 20, wherein the angularly adjustable drive rollers are supported by a frame, an orientation of the frame being adjustable, and wherein when the orientation of the frame is adjusted, orientations of the drive rollers are adjusted in synchrony.

22. A conveyor system comprising:

a conveyor belt having a frame and a plurality of free-spinning conveyor belt rollers supported by the frame, the conveyor belt rollers extending above and below top and bottom surfaces of the frame and being configured to divert objects across the conveyor belt, the conveyor belt rollers having axes of rotation that are aligned with a direction of travel of the belt such that the conveyor belt rollers can divert objects in either transverse direction across the conveyor belt, the conveyor belt rollers being elongated along their axes of rotation; and a plurality of free-spinning angularly adjustable drive rollers that can be selectively engaged with and disengaged from the conveyor belt rollers from a position below the conveyor belt, angular orientations of the drive rollers being adjustable relative to the direction of belt travel such that the drive rollers can be selectively positioned from an orientation in which, through engagement with the conveyor belt rollers, the drive rollers rotate in the direction of belt travel to orientations in which the drive rollers rotate in directions other than the direction of belt travel;

wherein drive roller rotation in the direction of belt travel brakes the conveyor belt rollers so that they will not rotate and drive roller rotation in directions other than the direction of belt travel drives the conveyor belt rollers due to frictional forces between the drive rollers and the conveyor belt rollers;

wherein angular orientations of the drive rollers can be adjusted such that the drive rollers rotate in directions that form substantially any angle from at least approximately −70 degrees to at least approximately 70 degrees relative to the direction of belt travel.

23. The system of claim 22, wherein the angularly adjustable drive rollers comprise relatively short caster rollers that are aligned in rows transverse to the direction of belt travel and columns aligned with the direction of belt travel.

24. The system of claim 23, wherein at least two angularly adjustable drive rollers are positioned adjacent a conveyor belt roller during conveyor operation.

25. The system of claim 23, wherein at least some of the angularly adjustable drive rollers are independently actuable such that an angular orientation of at least some of the drive rollers can be independently controlled.

26. The system of claim 22, wherein the angularly adjustable drive rollers are elongated in a direction of their axes of rotation and are at least as long as the conveyor belt is wide.

27. The system of claim 26, wherein the angularly adjustable drive rollers are supported by a frame, an orientation of the frame being adjustable with an actuator, and wherein when the orientation of the frame is adjusted, orientations of the drive rollers are adjusted in synchrony.

28. A method for diverting objects, the method comprising:

supporting the objects on a conveyor belt that includes a plurality of free-spinning conveyor belt rollers *configured to directly contact the objects*;

engaging the conveyor belt rollers with free-spinning angularly adjustable drive rollers; and adjusting an angular orientation of the drive rollers relative to a direction of belt travel to adjust a diverting angle of the conveyor belt.

29. The method of claim 28, further comprising adjusting the angular orientation of the drive rollers such that a direction of rotation of the drive rollers in in line with the direction of conveyor belt travel to brake the conveyor belt rollers.

30. The method of claim 29, further comprising adjusting the angular orientation of the drive rollers from the orientation in which the direction of drive roller rotation is in line with the direction of conveyor belt travel to an orientation in which the direction of drive roller rotation forms an angle with the direction of belt travel so as to cause the conveyor belt rollers to accelerate from zero angular velocity to a final angular velocity.

*31. The system of claim 1, wherein the conveyor belt rollers protrude below the lower surface of the conveyor belt.*

*32. The system of claim 1, wherein the conveyor belt rollers are configured to directly contact the objects on the conveyor belt.*

*33. The system of claim 1, wherein the conveyor belt rollers are arranged in a multiplicity of columns of conveyor belt rollers extending along a length of the conveyor belt and in a multiplicity of rows of conveyor belt rollers extending across a width of the conveyor belt.*

*34. The system of claim 1, wherein the conveyor belt rollers are arranged in a multiplicity of columns of conveyor belt rollers extending along a length of the conveyor belt and wherein the drive mechanism includes a plurality of free-spinning drive rollers arranged in a multiplicity of columns, each column of free-spinning drive rollers being aligned with a column of conveyor belt rollers.*

*35. The system of claim 1, wherein the drive mechanism includes discrete groups of drive rollers individually controlled in different zones of the conveyor system.*

*36. The system of claim 35, wherein the discrete groups of drive rollers are individually rotatable in the different zones.*

*37. The system of claim 35, wherein the discrete groups of drive rollers are individually vertically actuable in the different zones to engage and disengage the conveyor belt rollers.*

*38. The system of claim 9, wherein the conveyor belt has an upper surface and a lower surface and the conveyor belt rollers protrude above the upper surface and below the lower surface.*

*39. The system of claim 9, wherein the conveyor belt rollers are arranged in a multiplicity of columns of conveyor belt rollers extending along a length of the conveyor belt and in a multiplicity of rows of conveyor belt rollers extending across a width of the conveyor belt.*

*40. The system of claim 9, wherein the conveyor belt rollers are arranged in a multiplicity of columns of conveyor belt rollers extending along a length of the conveyor belt and wherein the drive rollers are arranged in a multiplicity of columns extending along the length of the conveyor belt, each column of drive rollers being aligned with a column of conveyor belt rollers.*

*41. The system of claim 9, wherein the drive rollers are arranged in discrete groups that are individually controlled in different zones of the conveyor system.*

*42. A conveyor system comprising:*

*a conveyor belt having a plurality of free-spinning conveyor belt rollers arranged in a multiplicity of columns of conveyor belt rollers extending along a length of the conveyor belt and in a multiplicity of rows of conveyor belt rollers extending across a width of the conveyor belt, the conveyor belt rollers being configured to divert objects from the conveyor belt; and*

*a drive mechanism that engages the free-spinning conveyor belt rollers, the drive mechanism being configured to drive the conveyor belt rollers, the drive mechanism being adjustable such that at least one individual conveyor belt roller can be selectively rotated in a first angular direction and a second angular direction so that objects can be selectively diverted to either side of the conveyor belt at a desired diverting angle.*

*43. A conveyor system comprising:*

*a conveyor belt having a plurality of free-spinning conveyor belt rollers arranged in a multiplicity of columns of conveyor belt rollers extending along a length of the conveyor belt and configured to divert objects from the conveyor belt: and*

*a drive mechanism that engages the free-spinning conveyor belt rollers, the drive mechanism including a plurality of free-spinning drive rollers arranged in a multiplicity of columns of drive rollers equal in number to the multiplicity of columns of conveyor belt rollers, each column of drive rollers being aligned with a column of conveyor belt rollers, the drive rollers being configured to drive the conveyor belt rollers, wherein the drive mechanism is adjustable such that at least one individual conveyor belt roller can be selectively rotated in a first angular direction and a second angular direction so that objects can be selectively diverted to either side of the conveyor belt at a desired diverting angle.*

*44. A conveyor system comprising:*

*a conveyor belt having a plurality of free-spinning conveyor belt rollers arranged in columns extending along a length of the conveyor belt and configured to divert objects from the conveyor belt; and*

*a drive mechanism including drive rollers, each drive roller being directly engageable with all the free-spinning conveyor belt rollers of one of the columns of conveyor belt rollers, the drive mechanism being configured to drive the conveyor belt rollers, the drive mechanism being adjustable such that at least one individual conveyor belt roller can be selectively rotated in a first angular direction and a second angular direction so that objects can be selectively diverted to either side of the conveyor belt at a desired diverting angle.*

* * * * *